(12) United States Patent
Van Veluw et al.

(10) Patent No.: US 10,858,223 B2
(45) Date of Patent: Dec. 8, 2020

(54) DEEPWATER HOISTING SYSTEM AND METHOD

(71) Applicant: ITREC B.V., Schiedam (NL)

(72) Inventors: Cornelis Martinus Van Veluw, Schiedam (NL); Eric Romeijn, Schiedam (NL); Joop Roodenburg, Schiedam (NL)

(73) Assignee: ITREC B.V., Schiedam (NL)

( * ) Notice: Subject to any disclaimer, the term of this patent is extended or adjusted under 35 U.S.C. 154(b) by 0 days.

(21) Appl. No.: 16/478,056

(22) PCT Filed: Nov. 17, 2017

(86) PCT No.: PCT/NL2017/050747
§ 371 (c)(1),
(2) Date: Jul. 15, 2019

(87) PCT Pub. No.: WO2018/131995
PCT Pub. Date: Jul. 19, 2018

(65) Prior Publication Data
US 2020/0122982 A1 Apr. 23, 2020

(30) Foreign Application Priority Data

Jan. 16, 2017 (NL) .................................... 2018173

(51) Int. Cl.
| | | |
|---|---|---|
| *B66C 13/10* | (2006.01) | |
| *B63B 27/10* | (2006.01) | |
| *B66C 13/02* | (2006.01) | |
| *B66C 23/52* | (2006.01) | |

(Continued)

(52) U.S. Cl.
CPC .............. *B66C 13/10* (2013.01); *B63B 27/10* (2013.01); *B66C 13/02* (2013.01); *B66C 23/52* (2013.01);

(Continued)

(58) Field of Classification Search
CPC combination set(s) only.
See application file for complete search history.

(56) References Cited

U.S. PATENT DOCUMENTS 4,547,857 A * 10/1985 Alexander ............. B66D 1/525
212/308
8,235,228 B2 8/2012 Vasstrand
(Continued)

FOREIGN PATENT DOCUMENTS

| WO | WO 03/062042 A1 | 7/2003 |
| WO | WO 2009/005359 A1 | 1/2009 |
| WO | WO 2014/025253 A1 | 2/2014 |

OTHER PUBLICATIONS

Dutch Search Report, issued in Priority Application No. 2018173, dated Sep. 11, 2017.

(Continued)

*Primary Examiner* — Kyle Armstrong
(74) *Attorney, Agent, or Firm* — Birch, Stewart, Kolasch & Birch LLP

(57) ABSTRACT

A deepwater hoisting system includes a synthetic fibre rope winch assembly including a motor driven first winch and a length of synthetic fibre rope driven by said first winch. The synthetic fibre rope has an end remote from the first winch. The system further includes a steel wire winch assembly including a motor driven second winch and a length of steel wire driven by said second winch. The steel wire has an end remote from the second winch. At least the second winch is an active heave compensation motor driven winch. The system further includes a lifting block having a lifting block sheave, through which the synthetic fibre rope is run. The end of the synthetic fibre rope is connected to the end of the steel wire, so that the lifting block is suspended in a double-fall arrangement.

40 Claims, 12 Drawing Sheets

(51) Int. Cl.
   *B66D 1/52* (2006.01)
   *B66D 1/76* (2006.01)
   *B66D 3/08* (2006.01)
   *E21B 41/00* (2006.01)
   *F16L 1/16* (2006.01)
   *E21B 19/00* (2006.01)

(52) U.S. Cl.
   CPC ............... *B66D 1/525* (2013.01); *B66D 1/76* (2013.01); *B66D 3/08* (2013.01); *E21B 41/0007* (2013.01); *F16L 1/16* (2013.01); *E21B 19/002* (2013.01)

(56) References Cited

U.S. PATENT DOCUMENTS

| | | |
|---|---|---|
| 8,882,427 B2 | 11/2014 | Borøy |
| 2005/0191165 A1 | 9/2005 | Willis et al. |
| 2009/0261052 A1 | 10/2009 | Vasstrand |
| 2011/0253661 A1* | 10/2011 | Smith ..................... B63B 27/08 |
| | | 212/255 |
| 2012/0156003 A1 | 6/2012 | Battersby et al. |
| 2012/0217063 A1* | 8/2012 | Roodenburg ........... B66C 13/02 |
| | | 175/5 |
| 2013/0241221 A1 | 9/2013 | Boroy |
| 2013/0309018 A1* | 11/2013 | Mouchel .................. F16L 1/16 |
| | | 405/173 |
| 2015/0151953 A1 | 6/2015 | Weterings et al. |

OTHER PUBLICATIONS

International Search Report, issued in PCT/NL2017/050747, dated Feb. 6, 2018.

Written Opinion of the International Searching Authority, issued in PCT/NL2017/050747, dated Feb. 6, 2018.

* cited by examiner

DEEPWATER HOISTING SYSTEM AND METHOD

The present invention relates to a deepwater hoisting system and to methods for operating the deepwater hoisting system. The invention is primarily envisaged for deepwater installation of subsea equipment on the seabed, e.g. equipment as used in oil and gas fields, but may also be of use for A&R procedures aboard pipe lay vessels, etc.

Oil and gas exploration has in recent years led to subsea activities being moved to ever greater water depths. Large offshore discoveries have been made in Brazil, West Africa and the Gulf of Mexico in water depths of over 2000 meters and nowadays even over 3000 meters. These activities require, or would benefit from, the ability to handle heavy objects that are to be placed on the seabed. Traditionally these operations are partly limited by the weight of the steel lifting wire itself, which increasingly reduces the net hook capacity as more wire is deployed to reach the required depth. This capacity reduction becomes a significant cost driver for depths beyond 1000 meters, as this entails hoisting systems to become large in size and weight, posing high costs of investment and operation.

The weight penalty of steel wire can be avoided by using synthetic fiber rope as a substitute for deep waters, which fiber rope is close to neutrally buoyant in water. This substitution allows for a greater effective hook load at great depth, and also substantially reduces the size and weight of the hoisting system, which in turn allows for the use of a larger range of vessels, e.g. also relatively small vessels, for operations in deepwater.

Deepwater operations commonly involve a stage wherein heave compensation is required, e.g. when landing subsea equipment on the seabed or on top of pre-installed subsea equipment. Here some properties of synthetic fiber rope prove problematic, e.g. the sensibility of the fibers to heat, the inherent internal heat insulation property, and their vulnerability to mechanical stress, especially at elevated temperatures. These problematic properties appear for example when subjecting the fiber rope to cyclic bending over one or more sheaves, e.g. during a heave compensation entailing phase.

In prior art deepwater hoisting systems, e.g. as disclosed in WO03062042, U.S. Pat. Nos. 8,235,228, and 8,882,427, cyclic bending of the synthetic fiber rope is avoided by paying out, or drawing in, fiber rope in sections while the load is carried by a steel wire, until fully paid out, or drawn in. In this process the section of fiber rope on the winch and in between the winch and the connection with the steel wire is not tensioned by the load, and any fiber rope section is tensioned by the load only when fully extended, so that the risk of damage is reduced to a minimum. The section by section paying out, and drawing in, of fiber rope requires holding the fiber rope while the steel wire is detached for connection to a next section. This approach is time consuming.

In a first aspect, the object of the invention is to provide an improved or at least alternative deepwater hoisting system, and methods for deepwater hoisting.

According to the invention this is accomplished by a deepwater hoisting system according to claim 1, provided with heave compensation functionality, e.g. for deepwater installation of subsea equipment, wherein the system comprises:

a synthetic fiber rope winch assembly comprising a motor driven first winch and a length of synthetic fiber rope driven by said first winch, said synthetic fiber rope having an end remote from the first winch, a steel wire winch assembly comprising a motor driven second winch and a length of steel wire driven by said second winch, said steel wire having an end remote from the second winch, and a lifting block having a lifting block sheave, wherein the synthetic fiber rope is run through said lifting block sheave, wherein the ends of the synthetic fiber rope and of the steel wire are interconnected, so that the lifting block is suspended in a double-fall arrangement, wherein at least the second winch is an active heave compensation motor driven winch.

In the system of the invention, at least the second winch is provided with active heave compensation, e.g. in embodiments the one or more, possibly hydraulic, motors driving a drum of the second winch being operable in active heave compensation mode, e.g. the system comprising a controller connected to said second winch configured to operate the one or more winch drum drive motors in active heave compensation mode.

Through the interconnection of the synthetic fiber rope and the steel wire, heave compensation of the lifting block and the suspended object can be effectively accomplished by operating the active heave compensation on the second winch driving the steel wire, and preferably solely by means of this operation of the second winch. The need for heave compensation for the fiber rope is thereby avoided, and in embodiments the system lacks any provision for performing heave compensation of the fibre rope.

The inventive system allows for reduced investment, whilst at the same time providing great versatility, at least in embodiments thereof.

In embodiments, heave compensating the steel wire only allows for the heave compensation to be performed on a relatively small winch with a relatively small length of steel wire. For example the length of the steel wire is at most 10% of the length of the fiber rope. For example the steel wire winch assembly stores or is adapted to store a steel wire that is at most 10% of the length of the fiber rope and/or the storage capacity of the synthetic fire rope winch assembly to store fiber rope. Therefore, the moment of inertia of this second winch may be significantly smaller than for a winch which has to carry the full water depth length of steel wire, which would be the case in prior art systems. This advantageously leads to much more favourable behaviour of the second winch in to heave compensation operations. The invention also allows, in suitable embodiments, to perform deepwater hoisting and/or lowering in such a manner that not every time, e.g. every job, the same stretch of steel wire is subjected to cyclic bending during a stage involving heave compensation. One can for instance perform a first deepwater operation such that therein a first stretch of the steel wire is subjected to cyclic bending during a heave compensation stage, e.g. as it passes over one or more sheaves and/or at the drum of the winch, and perform a subsequent second deepwater operation wherein the steel wire has been paid out further so that another, second, stretch of the steel wire is subjected to cyclic bending during a heave compensation stage. One can even envisage an approach wherein, during a heave compensation stage, by means of the second winch some steel wire is paid out and/or drawn in for the purpose of variation of the stretch of steel wire that is subjected to cyclic bending. This avoids that over time a specific stretch of the steel wire is time and again subjected to the cyclic bending due to heave compensation, thus extending the lifetime of the steel wire.

By the double fall arrangement the operation of the system for deepwater hoisting and/or lowering objects does not require the paying out and/or drawing in of fiber rope to take place in sections, eliminating the need to repeatedly connect and disconnect sections to and/or from each other and to and/or from the steel wire as in the mentioned prior art systems. As preferred the fiber rope can be paid out and/or drawn in in one piece, by a continuous operation the first winch, without requiring any intermittent connection and/or disconnection of sections thereof.

In embodiments, the first winch is a traction winch with the fibre rope being stored on a storage winch.

In respect to prior art deepwater hoisting systems, this capability of the system according to the invention allows for more efficient lifting and/or lowering of objects.

In operation fall parts of the synthetic fiber rope extend upwardly from the lifting block sheave at either side thereof. That is, it enters the lifting block sheave as extending from the first winch, and leaves it to extend further towards the connection thereof with the steel wire. Thereby these portions of synthetic fiber rope mutually define a wrap angle of the synthetic fibre rope around the rotation axis of the lifting block sheave.

During the lowering or lifting the block is immersed in the seawater, whereby the portion of the synthetic fiber rope that is slung around the lifting block sheave will be automatically cooled by the seawater.

Preferably said length of synthetic fibre rope is at least 600 meters long, in order to allow for the application of the system in deepwater. In particular, it would preferably be at least 4000 meters long, e.g. over 6000 meters long, e.g. between 8000 and 10000 meters long. As explained it is preferred for the length of synthetic fibre rope to be a single piece continuous length. Preferably, a storage winch is capable of storage of such length.

Configurations of the system of the invention, especially in a preferred embodiment wherein the connection between the ends of the fiber rope and the steel wire is releasable, allow for the steel wire and second winch to be used on their own to lower and/or lift an object, e.g. to perform hoisting applications in relatively low depth water and/or for handling an object above the water surface. For example the steel wire and second winch can be part of an onboard crane that is employed to load on object onto the vessel, to handle objects on deck of the vessel, etc. One can envisage the end of the steel wire would be connected with the object to be lifted in a single-fall arrangement or one could provide a lifting block for the steel wire and have a terminal end of the steel wire attached to some terminal point, e.g. on the crane itself, to have a dual fall or multiple fall arrangement of the steel wire in such operations, e.g. on-board operation.

In embodiments, e.g. in embodiments when the second winch is to be mounted on a revolving superstructure of a crane, e.g. on knuckle boom crane, the length of steel wire would preferably be at most 1000 meters long, e.g. at most 300 or even at most 200 meters long. Shorter lengths are also possible. This avoids undue weight of the second winch and associated steel wire.

In mentioned prior art systems operated by paying out, or drawing in, the fiber rope in sections the length of these sections, and/or the positions of connectors or gripping points on the fiber rope which are held while connecting and disconnecting sections to each other and/or to the steel wire during the lowering process directly implies a certain length of steel wire to be required. For instance, in case of the systems disclosed in U.S. Pat. Nos. 8,235,228 and 8,882,427, the lower end of the steel wire should remain connected to the connector at the lower end of each section until the fiber rope is fully paid out, so that the fiber rope can successively take over the load after the steel wire has been disconnected. This entails that paying out fiber rope for example in sections of 1000 meters would require the steel wire to have a length well in excess of 1000 meters. When operating the system of the present invention to lower and/or lift an object, in contrast to these prior art methods, the end of the steel wire remote from the second winch is not required to move along with the end of the fiber rope remote from the first winch during the lowering and/or lifting process. Thereby its length is virtually independent on the length of the length of the fiber rope to be paid out and/or drawn in, and/or the length of potential sections thereof. This allows the length of the steel wire to remain substantially shorter than would be required to perform the sectioned lowering of fiber rope of prior art methods.

Preferably the connector that interconnects the end of the synthetic fibre rope remote from the first winch and the end of the steel wire that is remote from the second winch is releasable. This would allow for the mentioned solo operation of the steel wire and second winch, and for convenient installation and/or replacement of the steel wire and synthetic fiber rope.

In an embodiment the system comprises a fiber rope departing sheave that is arranged above the water surface, e.g. fitted on a component of a crane, e.g. on a crane boom of a crane of the system, from which the fiber rope extends—in operation—into the water to the lifting block.

In an embodiment the system comprises a steel wire departing sheave that is arranged above the water surface, e.g. fitted on a component of a crane, e.g. on a crane boom of a crane of the system.

In an embodiment the system comprises a steel wire guide that is arranged, e.g. on the hull of the vessel or on the crane, to engage on the steel wire in between a steel wire departing sheave and the water surface, which a steel wire guide is adapted to deviate the steel wire from the imaginary straight line between the departing sheave and the lifting block sheave in order to spread the falls from which the lifting block is suspended. This e.g. done for purposes of reducing the risk for entanglement of the portions of the falls upwardly extending from the lifting block sheave at either side thereof. This concept has in a more general context been disclosed in an earlier published application by the applicant, namely WO2014/025253, therein by means of the 'hoist cable guide'. With regard to this content, this publication is incorporated herein by reference. By having the steel wire passing the steel wire guide, and—as preferred—the fiber rope not passing such a guide and instead passing to the lifting block in a substantially straight line, the fiber rope is relieved as much as possible from undue loads thereon, e.g. by such a path deviating guide, whereas the sturdier steel wire is passed along said guide with no undue detrimental load thereon.

In an embodiment the diameter of the lifting block sheave is at least 1.5 meters. The large diameter is beneficial for the bending and load on the fiber rope passing about the sheave.

In an embodiment the first winch is a traction winch, and the system further comprises a fiber rope storage winch which stores said length of synthetic fiber rope, and from which the synthetic fiber rope extends to said first winch, via which the synthetic fiber rope extends to the lifting block sheave. This allows for low tension spooling of the fiber rope on the storage winch, e.g. allowing for many winding layers to be spooled on the storage winch which is commonly difficult for fiber rope spooled onto a drum under the tension exerted by the object suspended from the fiber rope. For example, the storage winch is provided with a level winding device.

In embodiments the first winch and/or, if present the fiber rope storage winch, is mounted below decks. Below decks allows to shield the fiber rope from adverse conditions in an effective manner.

In an embodiment, the lifting block comprises two lifting block sheaves, side by side in a common vertical plane, e.g. each having a diameter of at least 0.5 m.

In this embodiment, advantageously the horizontal distance between the falls from which the lifting block is suspended is increased e.g. for purposes of reducing the risk for entanglement of the portions.

In embodiments the system comprises a crane, e.g. a knuckle boom crane, adapted to be fitted on an offshore vessel, the system comprising:
a pedestal adapted to be stationary fitted on the hull of a vessel,
a revolving superstructure supported on said pedestal via a slew bearing so as to allow revolving about a vertical slew axis,
a boom assembly connected to said superstructure and carrying at least one departing sheave for at least one of the fiber rope and the steel wire, e.g. carrying both a fiber rope departing sheave and a steel wire departing sheave.

The synthetic fibre rope may extend from the first winch to the lifting block sheave via a fibre rope departing sheave of the crane, e.g. at the end of a boom of the crane.

In an embodiment of the system, the first winch is a traction winch, and the system further comprises a storage winch which employs at least a portion of the total length of synthetic fiber rope. The synthetic fiber rope then extends from the storage winch to the first winch, via which the synthetic fiber rope extends to the lifting block sheave. This arrangement reduces the risk of damage of the synthetic fiber rope while being paid out from, and/or drawn in onto the first winch, by practically eliminating tensional forces on the fiber rope in the portion thereof that is spooled on the storage winch. Furthermore, the portion of the fiber rope that is in between the storage winch and the first winch is substantially not being tensioned. Thereby, any damage that could result from mechanical stress on the fiber rope while performing lifting and/or lowering heavy objects is reduced to a minimum.

In an embodiment of the system, the storage winch is mounted below the deck of a vessel, which may provide the additional advantage of saving space on or above the deck of the vessel it is provided on.

In an embodiment the first winch is mounted below the deck of a vessel, which may provide additional likewise benefits.

Current hoisting systems generally comprise a crane, e.g. onboard a crane vessel. The current invention allows for current hoisting systems e.g. hoisting system that are currently not being employed for deepwater hoisting, to be made suitable for this purpose by only slightly altering parts and/or the configuration thereof, in particular, to result in the system according to claim 1, so to directly benefit from its advantages in operation.

Moreover, by the same principle the invention allows for current deepwater hoisting systems, e.g. employing fiber rope, to be retrofitted to accord with the system of the current invention by only slightly altering parts and/or the configuration thereof, in particular, to result in the system according to claim 1, so to directly benefit from its advantages in operation.

In an embodiment of the system, the system comprises a knuckle boom crane, a type that is commonly used for the hoisting applications of interest, which is to be, or has been, fitted on an offshore vessel. In this embodiment the system comprises the generally required parts of the crane to suit the intended purpose, namely:
a pedestal to be stationary fitted on the hull of a vessel,
a revolving superstructure supported on said pedestal via a slew bearing so as to allow revolving about a vertical slew axis,
a knuckle boom assembly connected to said superstructure and carrying at least one departing sheave for at least one of the fiber rope and the steel wire, e.g. carrying both a fiber rope departing sheave and a steel wire departing sheave.

In an embodiment of the system, one of the motor driven first and second winches is mounted on the revolving superstructure. Therein, the other one of these first and second winches is not mounted on said revolving superstructure, e.g. is mounted in the pedestal or below decks. This arrangement may provide the additional advantage of saving space on or above the deck of vessel.

In practical embodiments, the first winch assembly employing the synthetic fiber rope will take up most space—so that not mounting the first winch and/or any associated fiber rope storage winch on the revolving superstructure, e.g. in the pedestal or below decks, would provide the highest benefits in this regard. For example the traction winch is arranged in the pedestal and the storage winch below the deck.

Preferably, in an embodiment the first winch is not mounted on the revolving superstructure, e.g. is mounted in the pedestal or below decks, and the second winch is mounted on the revolving superstructure of the crane, e.g. also bearing the fibre rope storage winch.

In another embodiment, both of said motor driven first and second winches are mounted on said revolving superstructure. In another embodiment, both of said motor driven first and second winches are not mounted on said revolving superstructure e.g. are mounted in said pedestal or below decks. These arrangements would comply to some current deepwater hoisting systems, that could be retrofitted to accord with the current invention.

In general, in an embodiment of the system wherein the first winch is a traction winch, and wherein the synthetic fibre rope winch assembly further comprises a storage winch which employs or accommodates at least a portion of said length of synthetic fiber rope, and from which the synthetic fiber rope extends to said first winch, via which the synthetic fiber rope extends to the lifting block sheave, of all winches the storage winch takes up most space. Therefore not mounting this storage winch on said revolving superstructure, e.g. in said pedestal or below decks, would provide the highest benefit in this regard.

Preferably, therefore in this embodiment the storage winch is not mounted on the revolving superstructure, e.g. is mounted in the pedestal or below decks.

Preferably, in a crane, the boom assembly carries both a fiber rope departing sheave and a steel wire departing sheave, wherein the fiber rope departing sheave and the steel wire departing sheave are arranged horizontally side by side offset from one another, e.g. to vertically extend parallel to each other.

When the hoisting block is lowered to where, possibly strong, water currents are present, a traditional hoisting block may, e.g. due to its generally flat shape and large diameter of the one or more sheaves, direct itself in the flow direction of this current, e.g. alike a vane in the wind. In order to prevent this, an embodiment of the deepwater hoisting system is proposed in which the lifting block comprises:
- a load bearing frame body having sides formed by two frame side members that are spaced apart from one another and define a space between them, said frame body further having a top, a bottom, and a central vertical axis,
- at least one sheave rotatably mounted in the space between said two frame side members each sheave being supported by said two frame side members, and
- a load connector suspended from said load bearing frame body in said central vertical axis and below the bottom thereof.

The lifting block further comprises one or more external shape adapter members mounted onto the load bearing frame body. These one or more external shape adapter members cover at least a majority of the sides of the load bearing frame body and define a substantially rotationally symmetric shape about the central vertical axis of the load bearing frame body.

The rotational symmetry about the central vertical axis of the load bearing frame body may prevent a horizontal bias of the lifting block in response to currents, e.g. particularly in response to substantially horizontally directed currents, and possible horizontal components of currents directed more up- or downwardly.

In embodiments, the lifting block has two external shape adapter members, each mounted onto a respective frame side members of the load bearing frame body and covering at least a majority of the respective side of the load bearing frame body, said two external shape adapter members thereby sandwiching the two frame side members between them and defining a substantially rotationally symmetric shape about the central vertical axis of the load bearing frame body.

Preferably, the one or more external shape adapter members define a substantially spheroid shape that is rotationally symmetric about at least the central vertical axis of the load bearing frame body.

A vertical bias of the lifting block in response to currents, e.g. in particular having a vertical component, is less likely to occur while hoisting and/or lowering a load as a result of the downward force thereon exerted by the load. Preferably, the lifting block is however still adapted such as to aim to prevent such a vertical bias, and thereto approaches rotational symmetry, or, more preferably, is substantially rotationally symmetric, about a central horizontal axis of the load bearing frame body as well.

In a practical embodiment, it is envisaged that two external shape adapter members are provided, each defining a half-spherical shape, of which the flat side faces and covers a side of the load bearing frame body, such that these external shape adapter members together with the still thereby not covered outer surface area of the load bearing frame body define a spherical, or approximately spherical, shape.

In embodiments, the load connector is swivable about said central vertical axis relative to said load bearing frame body.

In embodiments the one or more external shape adapter members are each solid over at least the majority of the volume they define.

In other embodiments the one or more external shape adapter members are in the form of one or more hollow shells. Therein, the one or more shells may be formed and mounted to the lifting block such that an interior of the shells is filled with water upon lowering these along with the lifting block below sea level.

In embodiments, the one or more shells are made out of plastic or steel material.

The invention also relates to a deepwater hoisting system provided with heave compensation functionality, e.g. for deepwater installation of subsea equipment, wherein the system comprises:
- a lifting block having a lifting block sheave,
- a synthetic fiber rope winch assembly comprising a motor driven first winch and a length of synthetic fiber rope driven by said first winch, said synthetic fiber rope having an end remote from the first winch, wherein the synthetic fiber rope is run through said lifting block sheave,
- a length of steel wire having a fixed end and a second end, wherein the end of the synthetic fiber rope and the second end of the steel wire are interconnected, so that the lifting block is suspended in a double-fall arrangement,
- an active heave compensation cylinder, which is operative on the length of steel wire.

Advantageously, said system comprises a crane, e.g. a knuckle boom crane, adapted to be fitted on an offshore vessel, wherein the active heave compensation cylinder is mounted to said crane, e.g. to the boom assembly of said crane. Alternatively, the active heave compensation cylinder is mounted to a vessel onto which the deepwater hoisting system is mounted. Preferably, the crane comprises:
- a pedestal to be stationary fitted on the hull of a vessel,
- a revolving superstructure supported on said pedestal via a slew bearing so as to allow revolving about a vertical slew axis,
- a boom assembly connected to said superstructure and carrying at least one departing sheave for at least one of the fiber rope and the steel wire, e.g. carrying both a fiber rope departing sheave and a steel wire departing sheave.

The invention also relates to a vessel provided with a system as described herein.

The invention also relates to a method for deepwater lowering of an object, e.g. for installation of subsea equipment on the seabed, wherein use is made of a system or vessel as described herein, wherein the object is suspended from the lifting block and is lowered from a position above or near the water surface to a position on or near the seabed, said lowering being in majority performed by pay out of fiber rope by means of the first winch, preferably substantially completely by pay out of fiber rope by means of the first winch, and wherein during one or more stages of said lowering heave compensation of the lifting block and the suspended object is provided by means of operating said second winch in active heave compensated mode. As preferred the first winch does not have heave motion compensation functionality or is not operated in a heave motion compensation mode during the lowering.

In an embodiment, during the lowering of the object, the connection between the ends of the fiber rope and said steel wire substantially remains in the same vertical position with the range of heave motion compensation only being rather minimal compared to the depth of lowering. As mentioned earlier, thereby the length of steel wire required to perform the lowering operations can remain limited.

More preferably, as discussed already, the general vertical position of the mentioned connection is varied over subsequent executions of the method. In this way, the portion of the length of steel wire that is in each execution of the method on the second motor driven winch and over any sheaves, and thus being exposed to the cycling bending that may result from the heave compensation of this winch, may be different per execution of the method.

Thereby, the wear on the steel wire on portions thereof along the length as a consequence of the cyclic bending is reduced, so to reduce the wear by this cause over the total length of the steel wire.

In an example of the method, during the lowering of the object, the connection between the ends of the synthetic fiber rope and of the steel wire may remain above the water surface, e.g. so that the steel wire remains above the water surface, e.g. lengthening the lifetime of the steel wire.

As explained the synthetic fiber rope used in deepwater lowering systems is much more vulnerable to fatigue failure as a consequence of repeated cyclic bending than steel wire. Typically the strength and the elastic modulus of the fiber rope increase at sub ambient temperatures, however start to decrease again as temperatures get higher than ambient. Thereby, the risk for wear/damage to the steel wire as a consequence of the repeated cyclic bending resulting from heave compensation by means of the second winch is much lower than that for damage to the synthetic fiber rope when one would apply the same motion compensation to the first winch.

In a preferred embodiment of the method, therefore, during the lowering of an object any heave compensation is solely provided by the second motor driven winch operated in active heave compensation mode. In fact, in a preferred embodiment, the system lacks functionality to operate the fiber rope in heave compensation mode altogether.

In an embodiment of the method, the first winch of the system is a traction winch, and the synthetic fiber rope winch assembly of the system further comprises a storage winch which employs at least a portion of said length of synthetic fiber rope, and from which the synthetic fiber rope extends to said first winch, via which the synthetic fiber rope extends to the lifting block sheave. In this example method during lowering the lifting block the synthetic fiber rope is substantially not being tensioned in the portion of the length of synthetic fiber rope that is on the storage winch. Furthermore it is substantially not being tensioned in the portion of said length of synthetic fiber rope that extends from the storage winch to the first winch. The fact that tensile forces on the synthetic fiber rope are practically absent limits the risk for wear/damage to the synthetic fiber rope as a consequence thereof during the execution of the method. It also facilitates the level winding.

In an embodiment of the method wherein the interconnection of the ends of the synthetic fibre rope and of the steel wire is releasable, one or more stages of lowering are preceded and/or succeeded by releasing this releasable interconnection of the ends of the synthetic fibre rope and of the steel wire for lowering an object. Herein use is made of the steel wire winch assembly, and no use is made of the synthetic fibre rope winch assembly during the lowering. This releasing would allow for the steel wire assembly to subsequently be used for other hoisting operations without involving the fiber rope, e.g. before or after the object is being lowered, or e.g. while the object is being lowered, e.g. by interveningly temporarily hanging off the end of the synthetic fiber rope on stationary parts of the system.

The invention also relates to a method for deepwater hoisting, in particular, for deepwater hoisting of subsea equipment. In this method use is made of the system of the invention. Therein an object, e.g. heavy subsea equipment, is lifted from a position on or near the seabed to a position above or near the water surface. Therein the lifting is in majority performed by draw in of fiber rope, preferably substantially completely by draw in of fiber rope. During one or more stages of this lifting, e.g. at the stage of pick-up of the object from the seabed, heave compensation of the lifting block is provided by means of operating the second winch in active heave compensated mode. Preferably therein the first winch does not have heave motion compensation, or is not being operated in heave motion compensation mode during this lifting.

Preferably, during the lifting of the object the connection between the ends of the fiber rope and said steel wire substantially remains in the same vertical position. As mentioned earlier, thereby the length of steel wire required to perform the lifting operations can remain limited. More preferably, the vertical position of the mentioned connection is varied along subsequent executions of the method. In this way, the portion of the length of steel wire that is in each execution of the method on the second motor driven winch, and thus being exposed to the cycling bending that may result from the heave compensation of this winch, is different per execution of the method. Thereby, the risk of damage on the steel wire on portions thereof along the length as a consequence of the cyclic bending is reduced, so to reduce the risk of damage by this cause over the total length of the steel wire.

In a preferred embodiment of the method, therefore, during the lifting of an object any heave compensation is solely provided by the second motor driven winch operated in active heave compensation mode.

In a second aspect, the invention relates to a submergible lifting block.

As explained before, when the hoisting block is lowered to where, possibly strong, currents are present, a traditional hoisting block may, e.g. due to its generally flat shape and large diameter of the one or more sheaves, direct itself in the flow direction of these currents, e.g. alike a vane in the wind. In order to prevent this, a submergible lifting block is proposed, e.g. for use as a lifting block in a deepwater hoisting installation according to the first aspect of the invention.

The submergible hoisting block according to the second aspect of the invention is adapted to suspend a load therefrom in a submerged condition with the block being suspended from at least one winch driven hoisting cable, e.g. winch driven fiber rope or steel wire. Therein the lifting block comprises:

a load bearing frame body having sides formed by two frame side members that are spaced apart from one another and define a space between them, said frame body further having a top, a bottom, and a central vertical axis, at least one sheave rotatably mounted in the space between said two frame side members each sheave being supported by said two frame side members, and a load connector suspended from said load bearing frame body in said central vertical axis and below the bottom thereof.

The lifting block further comprises one or more external shape adapter members mounted onto the load bearing frame body. These one or more external shape adapter members cover at least a majority of the sides of the load bearing frame body and define a substantially rotationally symmetric shape about the central vertical axis of the load bearing frame body.

The rotational symmetry of the shape defined by the one or more external shape adapter member about the central vertical axis of the load bearing frame body may prevent a horizontal bias of the lifting block in response to currents, e.g. particularly in response to substantially horizontally directed currents, and possible horizontal components of currents directed more up- or downwardly.

In embodiments, the submergible lifting block has two external shape adapter members, each mounted onto a respective frame side members of the load bearing frame body and covering at least a majority of the respective side of the load bearing frame body, said two external shape adapter members thereby sandwiching the two frame side members between them and defining a substantially rotationally symmetric shape about the central vertical axis of the load bearing frame body.

Preferably, the one or more external shape adapter members define a substantially spheroid shape that is rotationally symmetric about at least the central vertical axis of the load bearing frame body.

A vertical bias of the lifting block in response to currents, e.g. in particular having a vertical component, is less likely to occur while hoisting and/or lowering a load as a result of the downward force thereon exerted by the load. Preferably, the lifting block is however still adapted such as to aim to prevent such a vertical bias, and thereto approaches rotational symmetry, or, more preferably, is substantially rotationally symmetric, about a central horizontal axis of the load bearing frame body as well.

In a practical embodiment, it is envisaged that two external shape adapter members are provided, each defining a half-spherical shape, of which the flat side faces and covers a side of the load bearing frame body, such that these external shape adapter members together with the still thereby not covered outer surface area of the load bearing frame body define a spherical, or approximately spherical, shape.

In embodiments, the load connector is swivable about said central vertical axis relative to said load bearing frame body.

In embodiments the one or more external shape adapter members are each solid over at least the majority of the volume they define.

In other embodiments the one or more external shape adapter members are in the form of one or more hollow shells. Therein, the one or more shells may be formed and mounted to the lifting block such that an interior of the shells is filled with water upon lowering these along with the lifting block below sea level.

In embodiments, the one or more external shape adapter members are made out of plastic or steel material.

The invention also relates to a deepwater hoisting system, e.g. for deepwater installation of subsea equipment, wherein the system comprises a submergible lifting block according to the second aspect of the invention.

The invention also relates to a vessel provided with such a system, and a method for deepwater lowering of an object, e.g. for installation of subsea equipment on the seabed, wherein use is made of such a system.

Either aspect of the invention is also applicable to abandonment and recovery (A&R) of pipeline, cable or umbilical from an offshore lay vessel, wherein use is made of a system or a submergible lifting block according to the invention.

The invention is further explained in relation to the attached drawings, in which.

Figure 9:
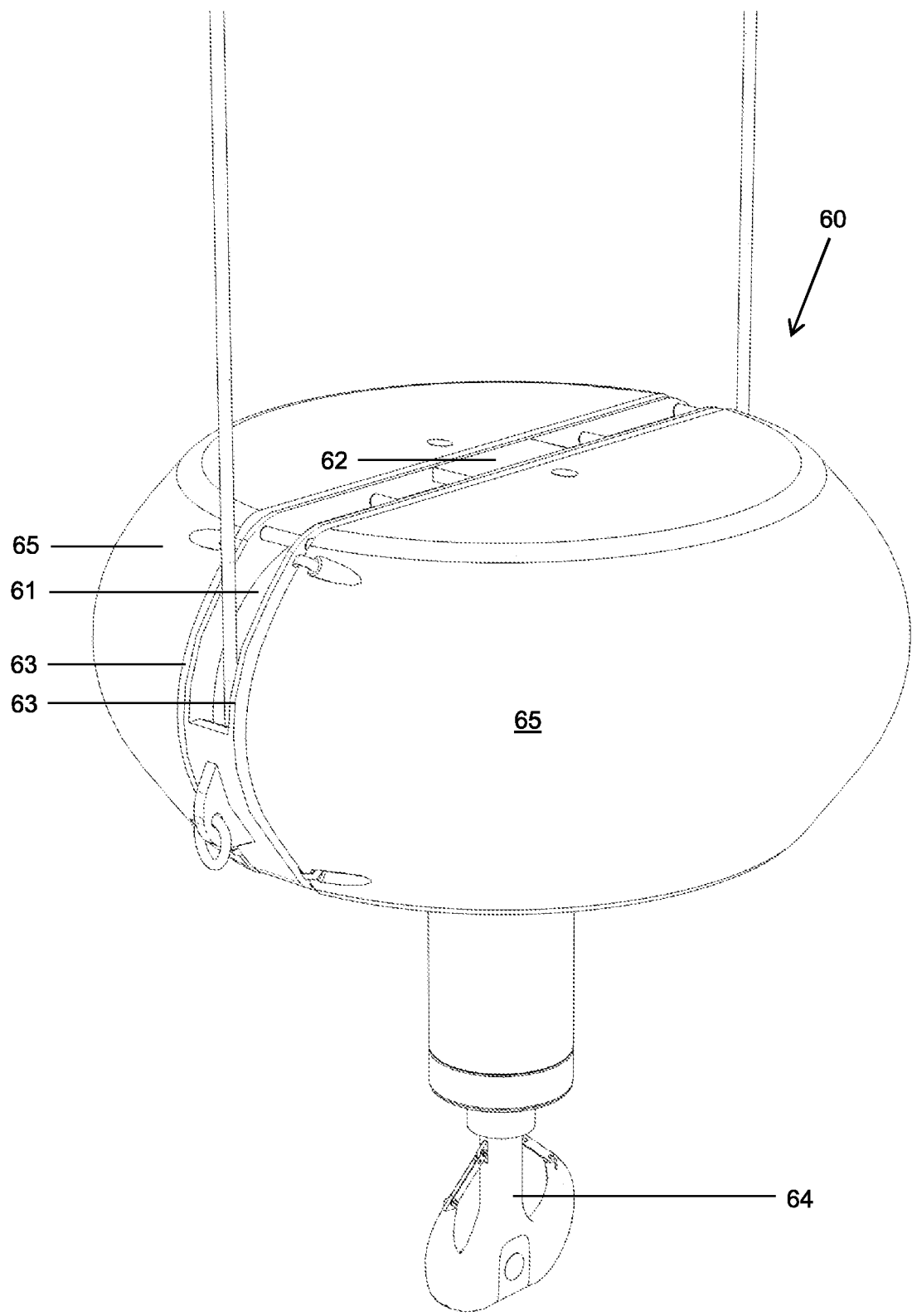
Figure 10:
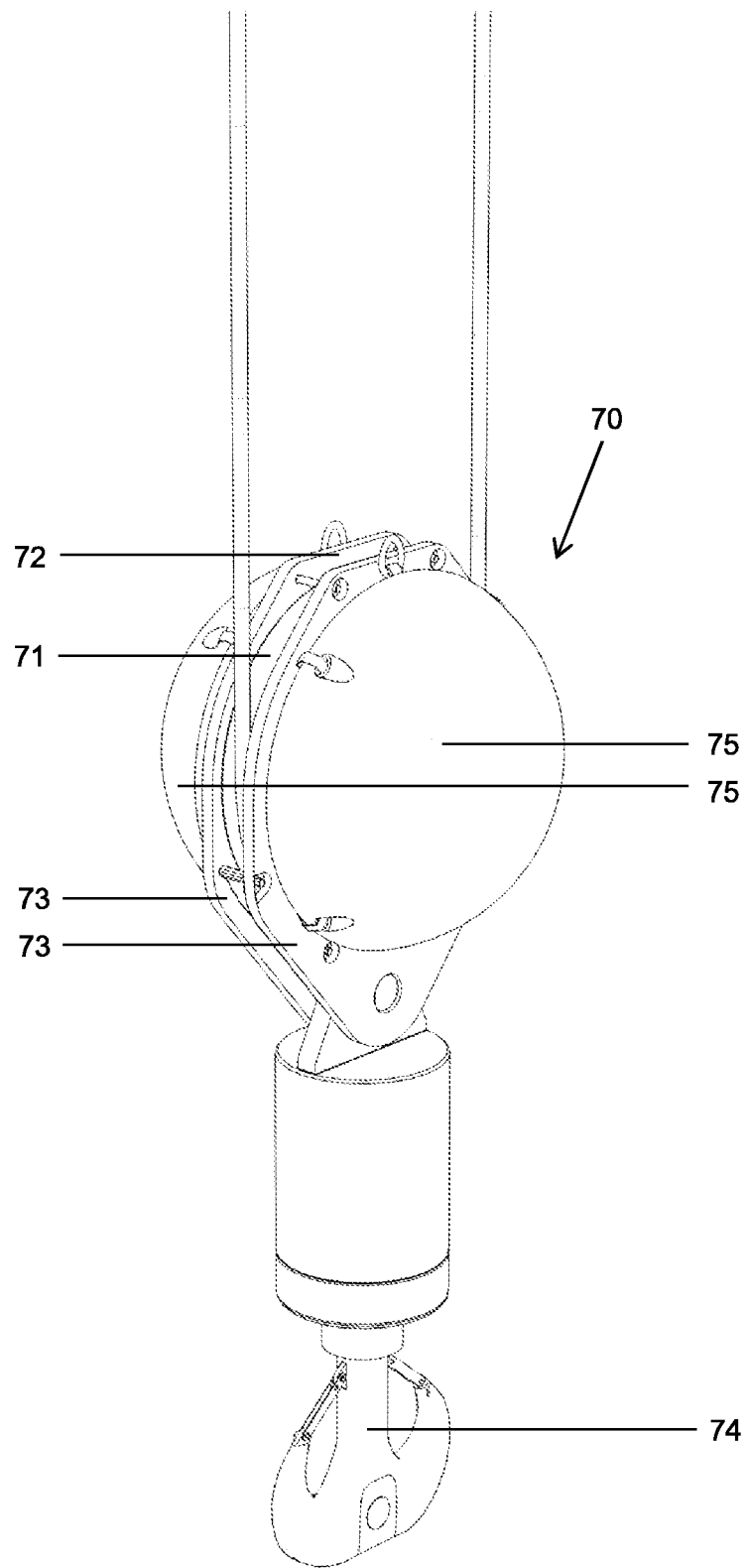

FIGS. 9-10 each show a possible embodiment of the lifting block.

Figure 1:
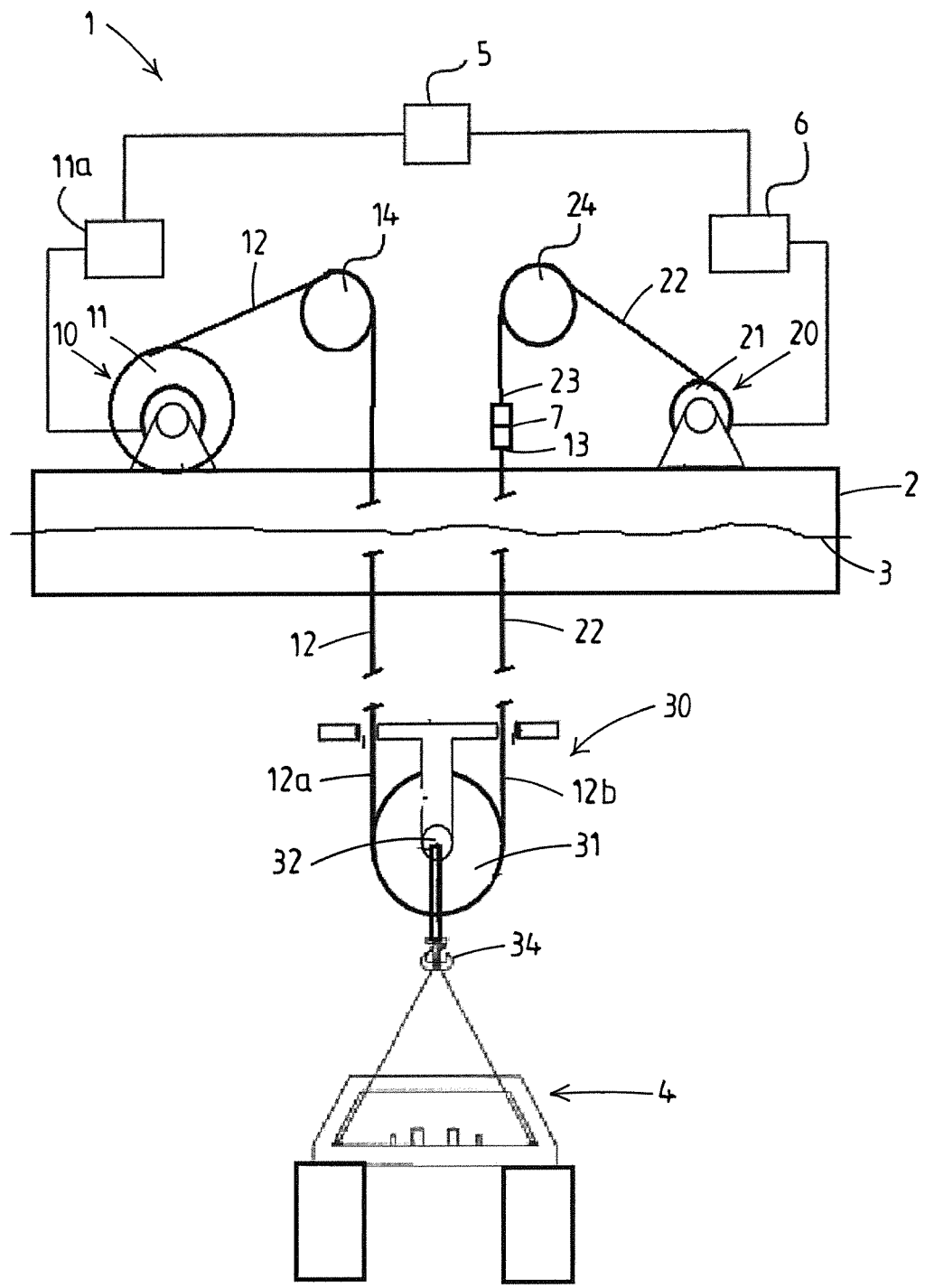
FIG. 1 shows a schematic of a deepwater hoisting system according to the current invention being provided on a vessel.

FIG. 1 schematically shows a deepwater hoisting system 1 in accordance with the invention. The system 1 is provided on a vessel 2 that is floating on the water surface 3. As depicted the system is used for lowering or hoisting a subsea object 4, e.g. a subsea template.

The system 1 comprises a synthetic fibre rope winch assembly 10 comprising a motor driven first winch 11 and a length of synthetic fibre rope 12 driven by said first winch 11. The synthetic fibre rope 12 has an end 13 remote from the first winch 11.

The system 1 further comprises a steel wire winch assembly 20 comprising a motor driven second winch 21 and a length of steel wire 22 driven by said second winch 21. The steel wire 22 has an end 23 remote from the second winch 21.

The system further comprises a main controller 5, e.g. a computerized controller, that is connected to AHC mode controller 6 which provides the system 1 with heave compensation functionality. The AHC mode controller 6 is connected to the second winch 21, so that the second winch 21 is an active heave compensation motor driven winch. The same controller 5 is connected to a control unit 11a of the winch 11.

The system further comprises a lifting block 30 having a lifting block sheave 31 with axis 32, through which the synthetic fibre rope 12 is run. The lifting block 30 here has a load connector 34, here a hook, from which the object 4 is suspended.

The end 13 of the synthetic fibre rope 12 is connected to the end 23 of the steel wire 22 by means of a connector 7, so that the lifting block 30 is suspended in a double-fall arrangement.

Figure 3:
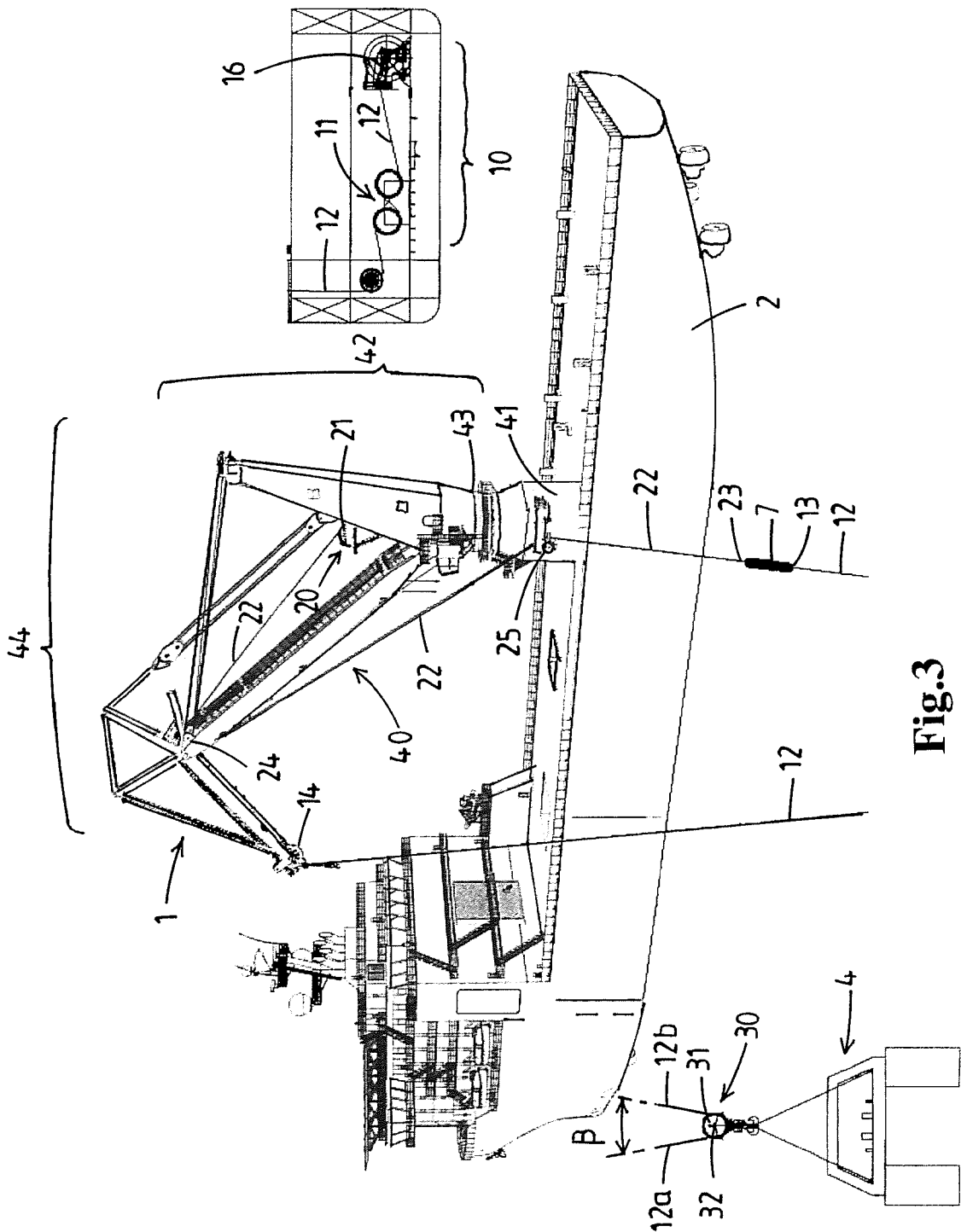

As shown in FIG. 3, fall parts 12a, 12b of the synthetic fibre rope 12 upwardly extend from lifting block sheave 31 at either side thereof.

Preferably said length of synthetic fibre rope 11 is at least 600 meters long to allow for the application of the system in deepwater, in particular at least 4000 meters long.

Preferably the length of steel wire 22 is at most 1000 meters long, in particular at most 300 or 200 meters long.

Preferably the connector 7 that interconnects, and thus forms the connection between, the end 13 of the synthetic fibre rope 12, and the end 23 of the steel wire 22 is releasable.

In the embodiment of FIG. 3 the falls are spread apart, e.g. so to reduce the risk for entanglement of the portions of the falls upwardly extending from the lifting block sheave 31 at either side thereof.

As shown in FIGS. 1-5, the synthetic fibre rope 12 extends from the first winch 11 to the lifting block sheave 31 via a fiber rope departing sheave 14.

As shown in FIGS. 1-5, the steel wire 22 extends from the second winch 21 to the connector 7 via a steel wire departing sheave 24.

Furthermore, as illustrated in FIG. 3, the system 1 may comprise a steel wire hoist cable guide 25 which, at an operational position thereof, is adapted to guide the steel wire 22 between the steel wire departing sheave 24 and the connector 7, so to deviate the steel wire from the straight line between the departure sheave and the lifting block and thus to spread the fall apart.

Preferably, e.g. in order to limit back-and-forth movement of the portion of the synthetic fiber rope 12 that is run through the lifting block sheave 31 as much as possible, the diameter of the lifting block sheave 31 is at least 1.5 meters.

In embodiment shown in FIG. 3 the first winch 11 is a traction winch, and the system 1 further comprises a fiber rope storage winch 16 which stores the length of synthetic fiber rope 12. The synthetic fiber rope 12 extends from the storage winch 16 to the first winch 11, via which the synthetic fiber rope 12 extends to the lifting block sheave 31.

In the embodiment shown in FIG. 3 the storage winch 16 is mounted below decks, which may provide the additional advantage of saving space on or above the deck of vessel 2. In this same embodiment the first winch 11 is mounted below decks, which may provide additional likewise benefits.

In embodiments shown in FIGS. 2-5 system 1 comprises a crane 40, namely of the type knuckle boom crane, which fitted on an offshore vessel 2.

Therein the system 1 comprises:
a pedestal 41 to be stationary fitted on the hull of a vessel 2,
a revolving superstructure 42 supported on said pedestal 41 via a slew bearing 43 so as to allow revolving about a vertical slew axis,
a boom assembly 44, here a knuckle boom assembly, connected to the superstructure 42 and carrying both departure sheaves 14, 24.

Figure 5:
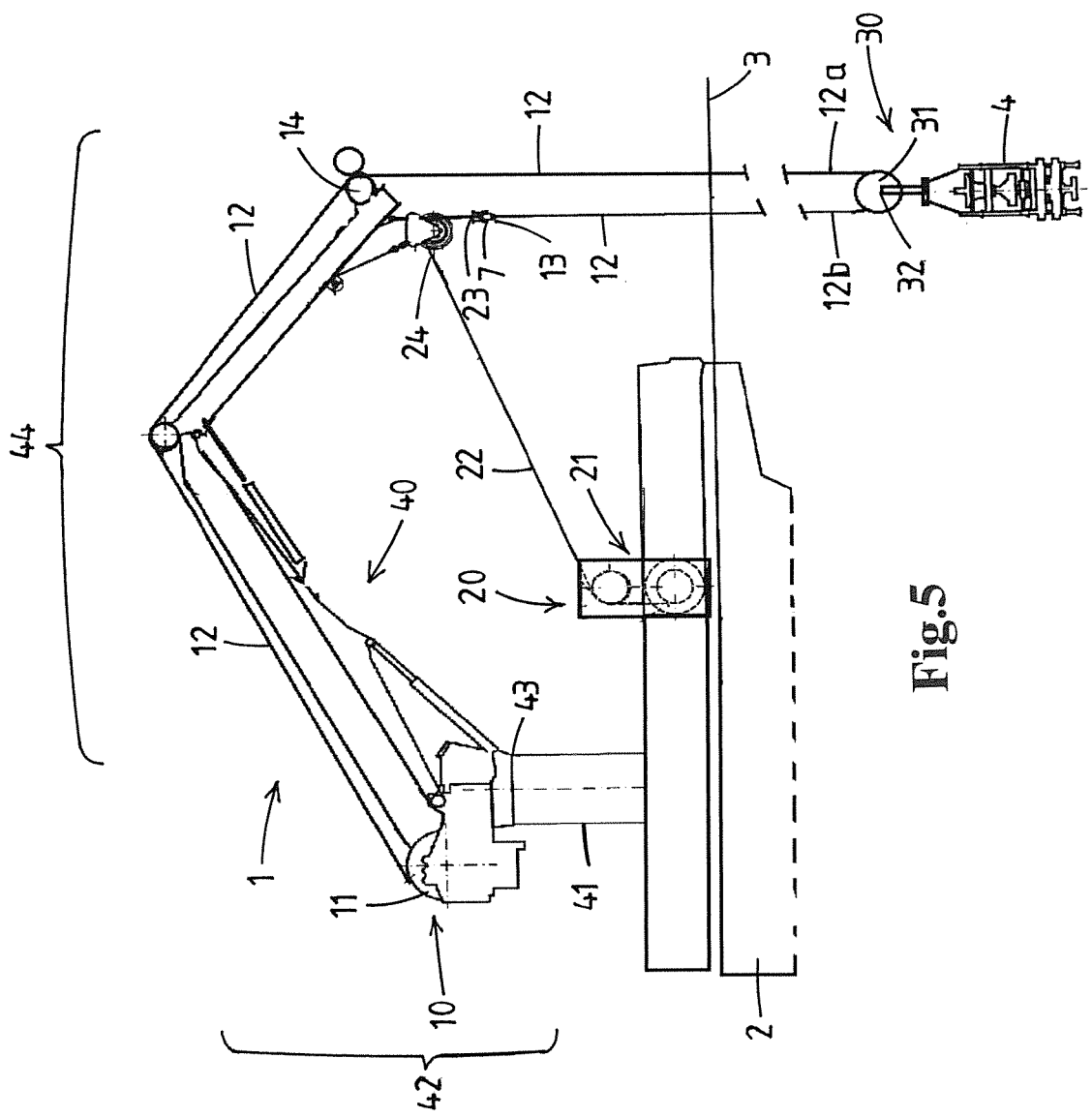

FIGS. 3 and 5 illustrate embodiments of system 1 wherein one of the motor driven first and second winches 11, 21 is mounted on the revolving superstructure 42. Therein the other one of said first and second winches 11, 21 is not mounted on the revolving superstructure 42, e.g. is mounted in said pedestal 41 or below decks. This may provide the additional advantage of saving space on or above the deck of vessel 2.

More in particular, FIG. 3 shows an embodiment of system 1 wherein the second winch 21 is mounted on the revolving superstructure 42, and wherein the first winch 11 is below decks. Furthermore, a storage winch 16 is provided, which is mounted below decks.

FIG. 5 shows an embodiment of system 1 wherein the first winch 11 is mounted on the revolving superstructure 42, and wherein the second winch 21 is mounted below decks.

Figure 2:
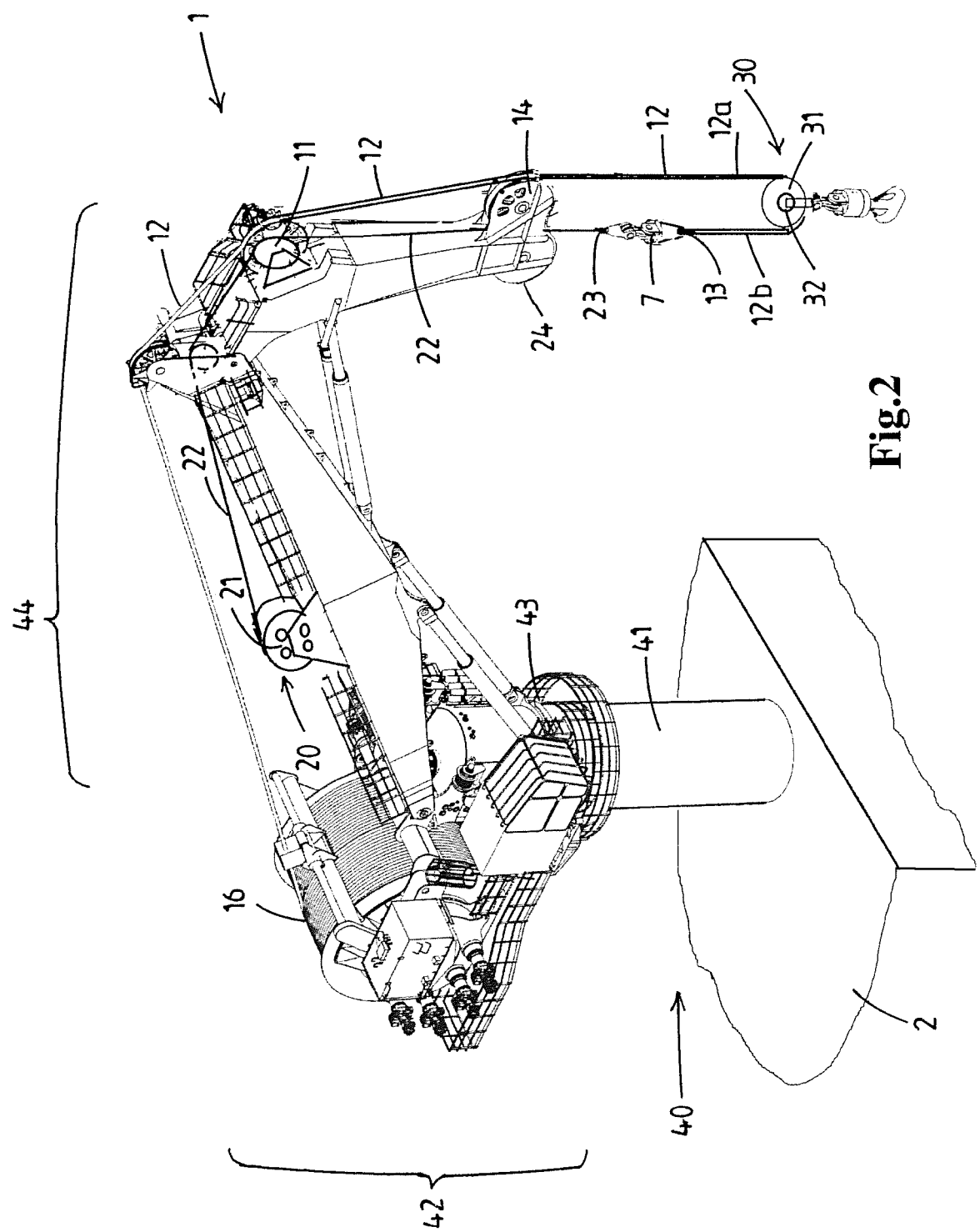
FIGS. 2, 3, 4, 5, 6, 7A, 7B, 7C & 8 show example embodiments of the system according to the current invention being provided on a vessel, each example embodiment comprising a crane.
Figure 4:
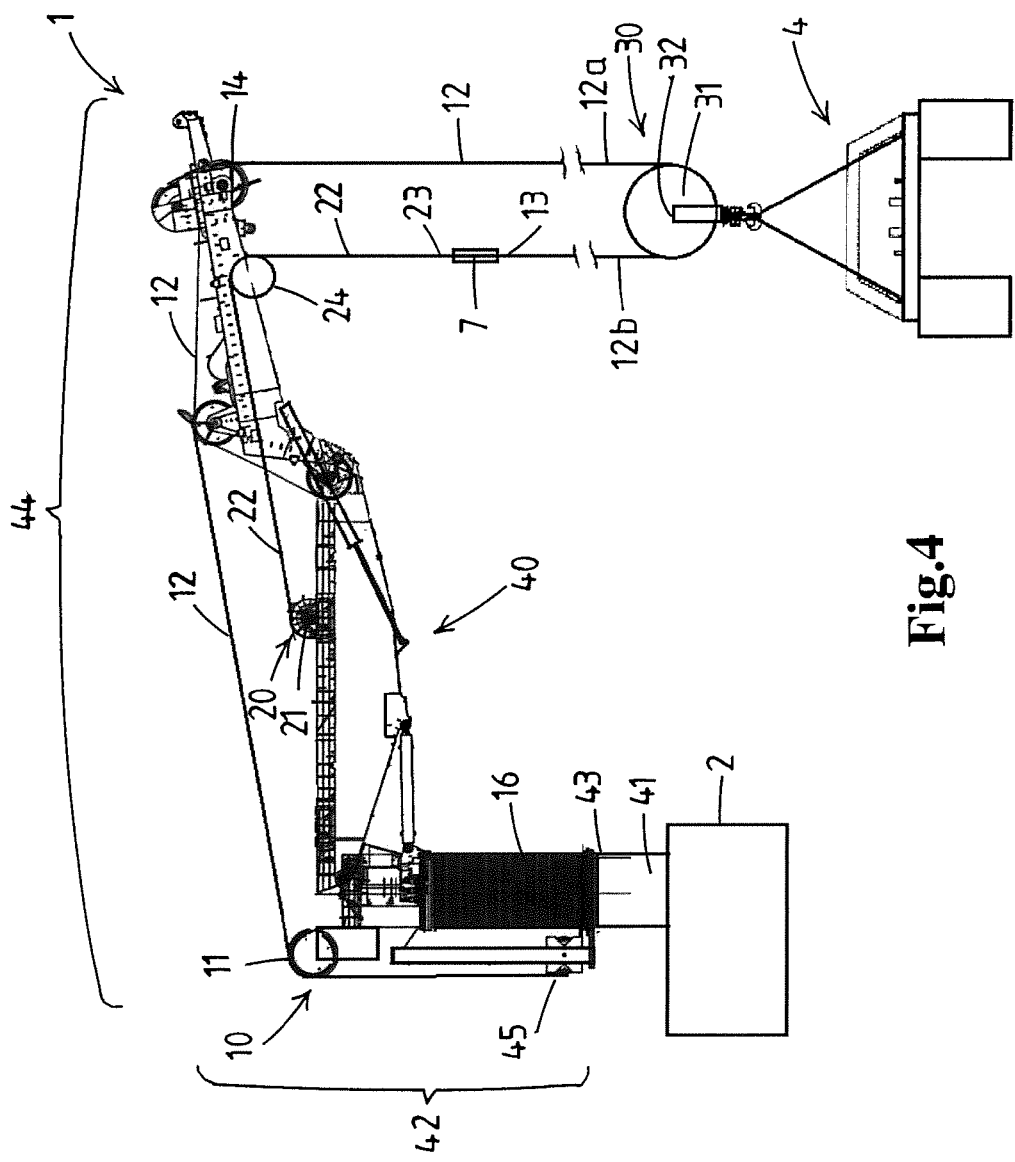

FIGS. 2 and 4 illustrate embodiments of system 1 wherein both of said motor driven first and second winches 11, 21 are mounted on said revolving superstructure 42.

In another embodiment of system 1, both of said motor driven first and second winches 11, 21 are not mounted on said revolving superstructure 42, e.g. are mounted in said pedestal or below decks.

FIG. 4 illustrates the fiber rope being spooled on a vertical axis drum 16 that is concentric with the slew bearing axis of the crane. A level winding mechanism 45 performs the winding of the fiber rope on the drum.

FIG. 5 illustrates that the second winch 21 can be embodied as a temporary winch that is mounted aboard the vessel, e.g. on deck, here to be combined with a dedicated fiber rope deepwater knuckle boom crane of the vessel. The steel wire 22 of the winch 21 here is passed over a sheave 24 that is already present on the knuckle boom or, as here, also temporarily fitted thereon. The end of the steel wire is connected at 7 to the fiber rope 12, with the lifting block 30 being connected to the object 4, here subsea tree equipment.

Figure 6:
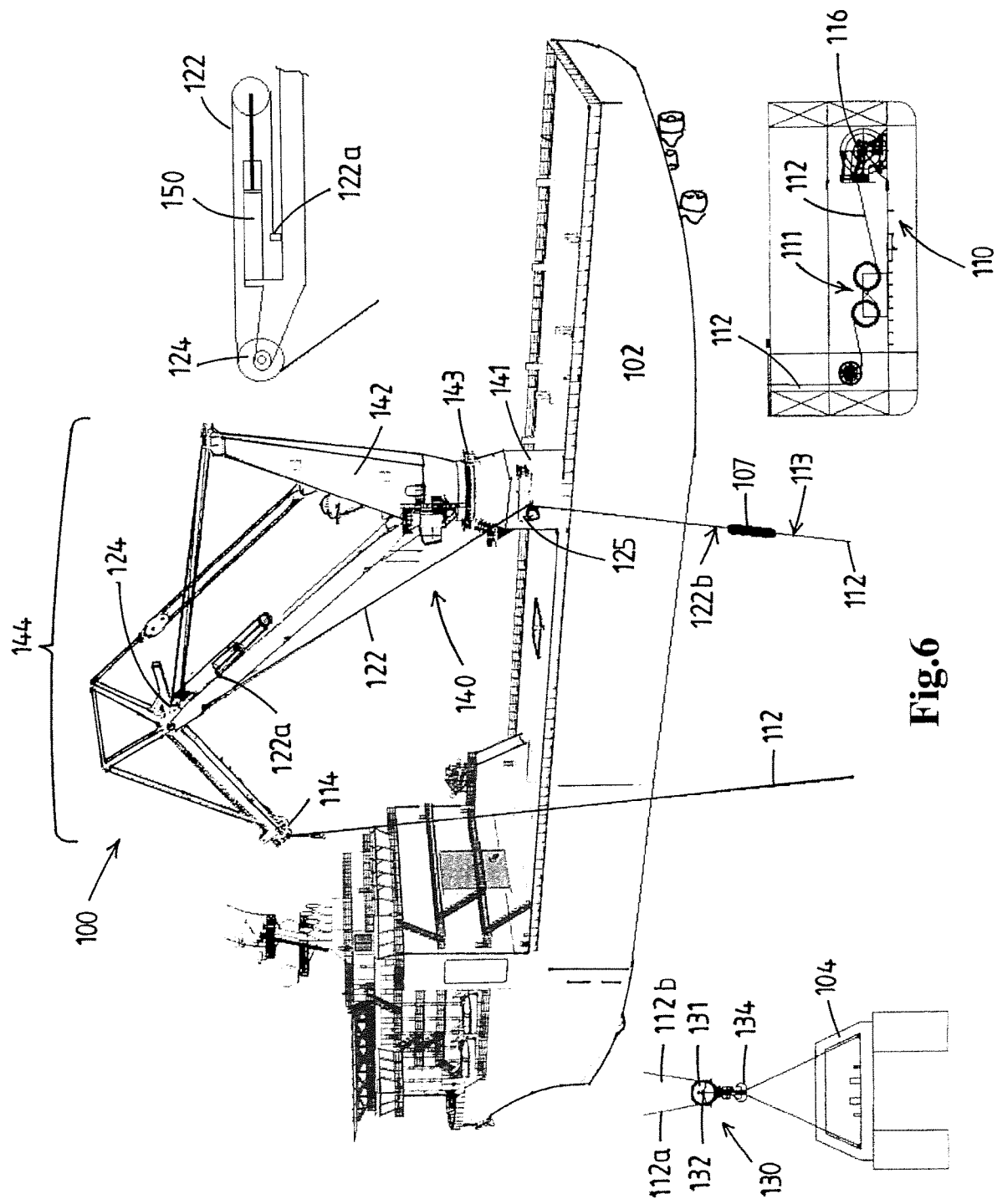

In FIG. 6 an alternative deepwater hoisting system 100 is shown. The system 100 is provided on a vessel 102 that is floating on a water surface. The system is used for lowering and/or hoisting a subsea object, here a subsea template 104.

The system 100 comprises a synthetic fibre rope winch assembly 110 comprising a motor driven first winch 111 and a length of synthetic fibre rope 112 driven by said first winch 111.

The synthetic fibre rope 112 has an end 113 remote from the first winch 111. Here, the first winch 111 is a traction winch, and the system 100 further comprises a fiber rope storage winch 116 which stores the length of synthetic fiber rope 112. The synthetic fibre rope 112 extends from the storage winch 116 via the first winch 111 and via a fibre rope departing sheave 114 to a lifting block sheave 131.

The system further comprises a lifting block 130 having a lifting block sheave 131 with axis 132, through which the synthetic fiber rope 112 is run. The lifting block 130 here has a load connector 134, namely a hook, from which the object 104 is suspended.

The system 100 further comprises a length of steel wire 122 having a fixed end 122a and a second end 122b, wherein the end of the synthetic fiber rope 113 and the second end 122b of the steel wire are interconnected, here by means of a connector 107, so that the lifting block 130 is suspended in a double-fall arrangement.

In the embodiment of FIG. 6 an active heave compensation cylinder 150 is provided, which is operative on the length of steel wire 122. Here the active heave compensation cylinder 150 is provided adjacent the fixed end 122a of the steel wire 122, prior to a steel wire departing sheave 124.

The steel wire 122 extends from the fixed end 122a along the heave compensation cylinder 150 via the steel wire departing sheave 124 and in the shown embodiment also via a steel wire hoist cable guide 125 which, at an operational position thereof, is adapted to guide the steel wire 122, to the connector 107. The steel wire hoist cable guide 125 deviates the steel wire from the straight line between the departure sheave and the lifting block and thus spreads the falls apart.

The system 100 further comprises a crane 140, here of the type knuckle boom crane, which is fitted on the offshore vessel 102. A pedestal 141 is fitted on the hull of the vessel 102, and a revolving superstructure 142 is supported on said pedestal 141 via a slew bearing 143 so as to allow revolving about a vertical slew axis. The crane comprises a boom assembly 144, here a knuckle boom assembly, connected to the superstructure 142 and carrying both departure sheaves 114, 124. The active heave compensation cylinder 150 is in the shown embodiment also mounted to the boom assembly.

As shown in FIG. 6, the fall parts 112a, 112b of the synthetic fibre rope 12 upwardly extend from lifting block sheave 131 at either side thereof. The falls are spread apart, e.g. so to reduce the risk for entanglement of the portions of the falls upwardly extending from the lifting block sheave 131 at either side thereof.

Preferably said length of synthetic fiber rope 111 is at least 600 meters long to allow for the application of the system in deepwater, in particular at least 4000 meters long.

Preferably the length of steel wire 122 is at most 1000 meters long, in particular at most 300 or 200 meters long.

Preferably the connector 107 that interconnects, and thus forms the connection between, the end 113 of the synthetic fiber rope 112, and the second end 122b of the steel wire 122 is releasable.

Figure 7A:
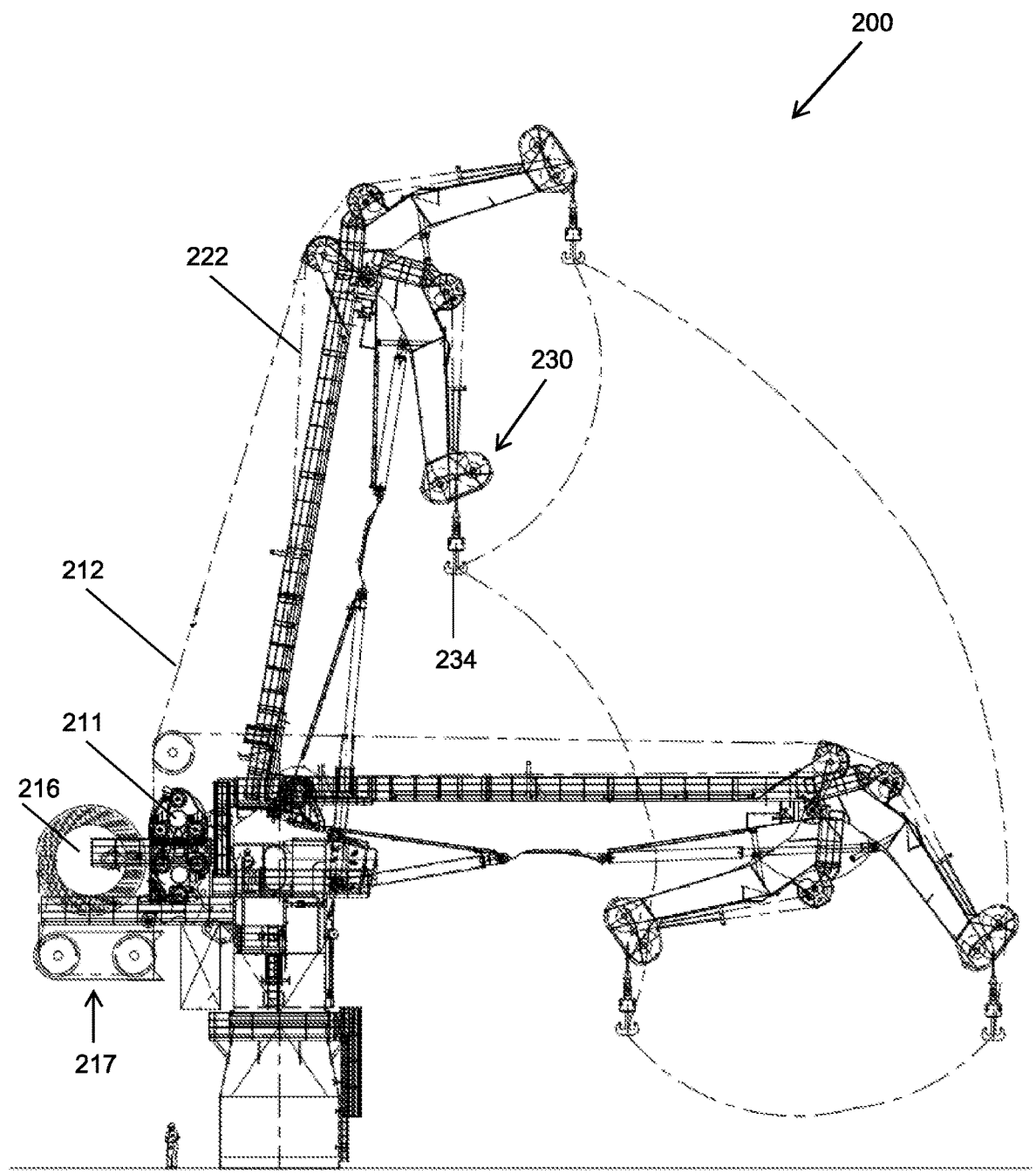
Figure 7B:
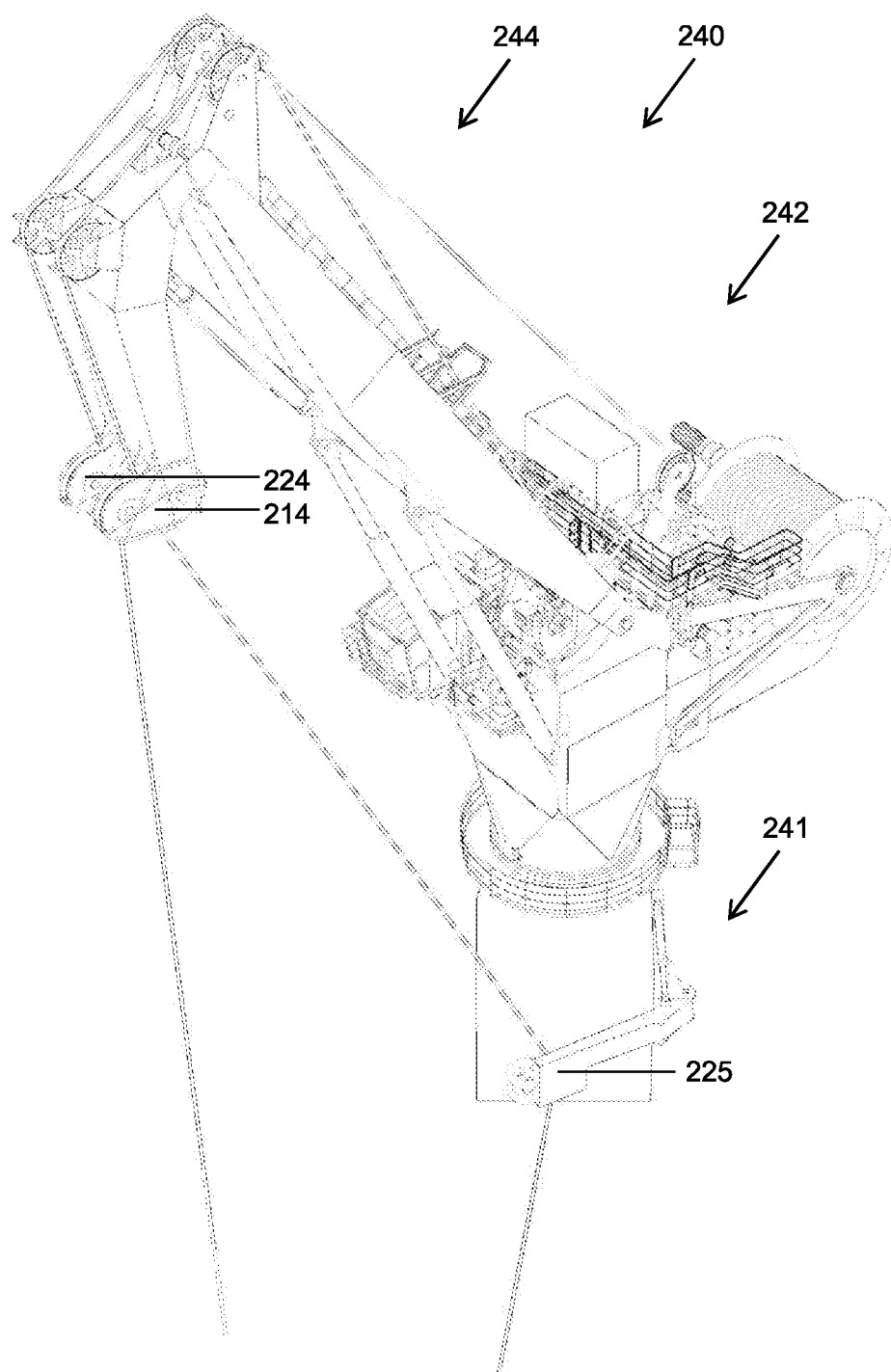
Figure 7C:
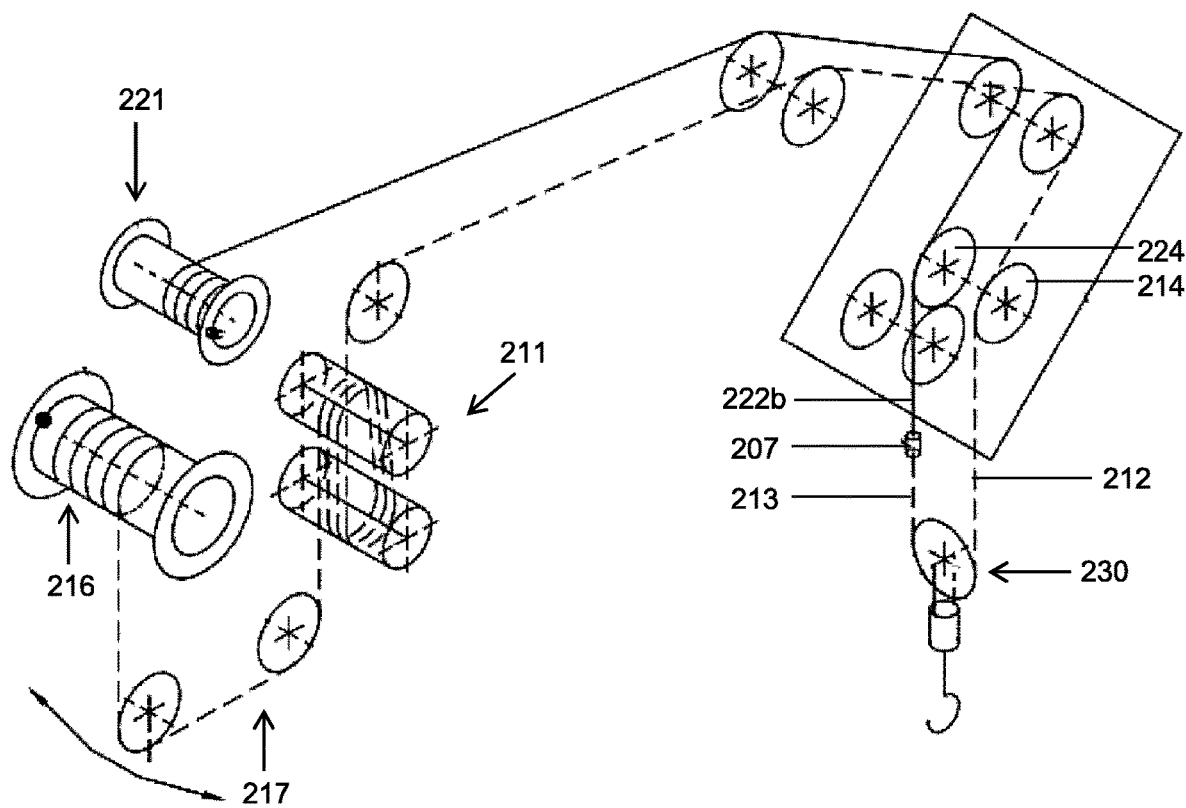

FIGS. 7A-C show an embodiment of the system 200 which is used for lowering and/or hoisting a subsea object. Therein FIG. 7A provides a side view, FIG. 7B a perspective view and FIG. 7C a schematic view of the course of the hoisting cables.

The system 200 comprises a synthetic fiber rope winch assembly comprising a motor driven first winch 211 and a length of synthetic fibre rope 212 driven by said first winch 211. Here, the first winch 211 is a traction winch, and the system 200 further comprises a fiber rope storage winch 216 which stores the length of synthetic fiber rope 212, and a level winding or spooling device 217. The synthetic fibre rope 212 extends from the storage winch 216 via the level winding or spooling device 217 and the first winch 211 and via a fiber rope departing sheave 214 to a lifting block sheave 231.

The system further comprises a lifting block 230 through which the synthetic fiber rope 212 is run. The lifting block 230 here has a load connector 234, namely a hook, from which the object is to be suspended.

The system 200 further comprises a length of steel wire 222 having a second end 222b, wherein the end of the synthetic fiber rope 213 and the second end 222b of the steel wire are interconnected, here by means of a connector 207, so that the lifting block 230 is suspended in a double-fall arrangement.

The steel wire 222 extends from a second winch 221 via a steel wire departing sheave 224 and in the shown embodiment also via a steel wire hoist cable guide 225 which, at an operational position thereof, is adapted to guide the steel wire 222, to the connector 207. The steel wire hoist cable guide 225 deviates the steel wire from the straight line between the departure sheave and the lifting block and thus spreads the falls apart.

The system 200 further comprises a crane 240, here of the type knuckle boom crane. A pedestal 241 is fitted on the hull of a vessel. A revolving superstructure 242 is supported on said pedestal 241 via a slew bearing so as to allow revolving about a vertical slew axis. The crane comprises a boom assembly 244, here a knuckle boom assembly, connected to the superstructure 242 and carrying both departure sheaves 214, 224.

As can be verified in FIG. 7B, the fiber rope departing sheave 214 and the steel wire departing sheave 224 are arranged to vertically extend parallel to each other.

As shown in FIG. 7B, the fall parts of the synthetic fibre rope 212 upwardly extend from lifting block sheave 231 at either side thereof. The falls are spread apart, e.g. so to reduce the risk for entanglement of the portions of the falls upwardly extending from the lifting block sheave 231 at either side thereof.

Preferably the length of synthetic fiber rope 211 is at least 600 meters long to allow for the application of the system in deepwater, in particular at least 4000 meters long.

Preferably the length of steel wire 222 is at most 1000 meters long, in particular at most 300 or 200 meters long.

Preferably the connector 207 that interconnects, and thus forms the connection between, the end 213 of the synthetic fiber rope 212, and the second end 122b of the steel wire 122 is releasable.

FIG. 7A shows the lifting block 230 comprising two lifting block sheaves along substantially the same vertical plane.

Figure 8:
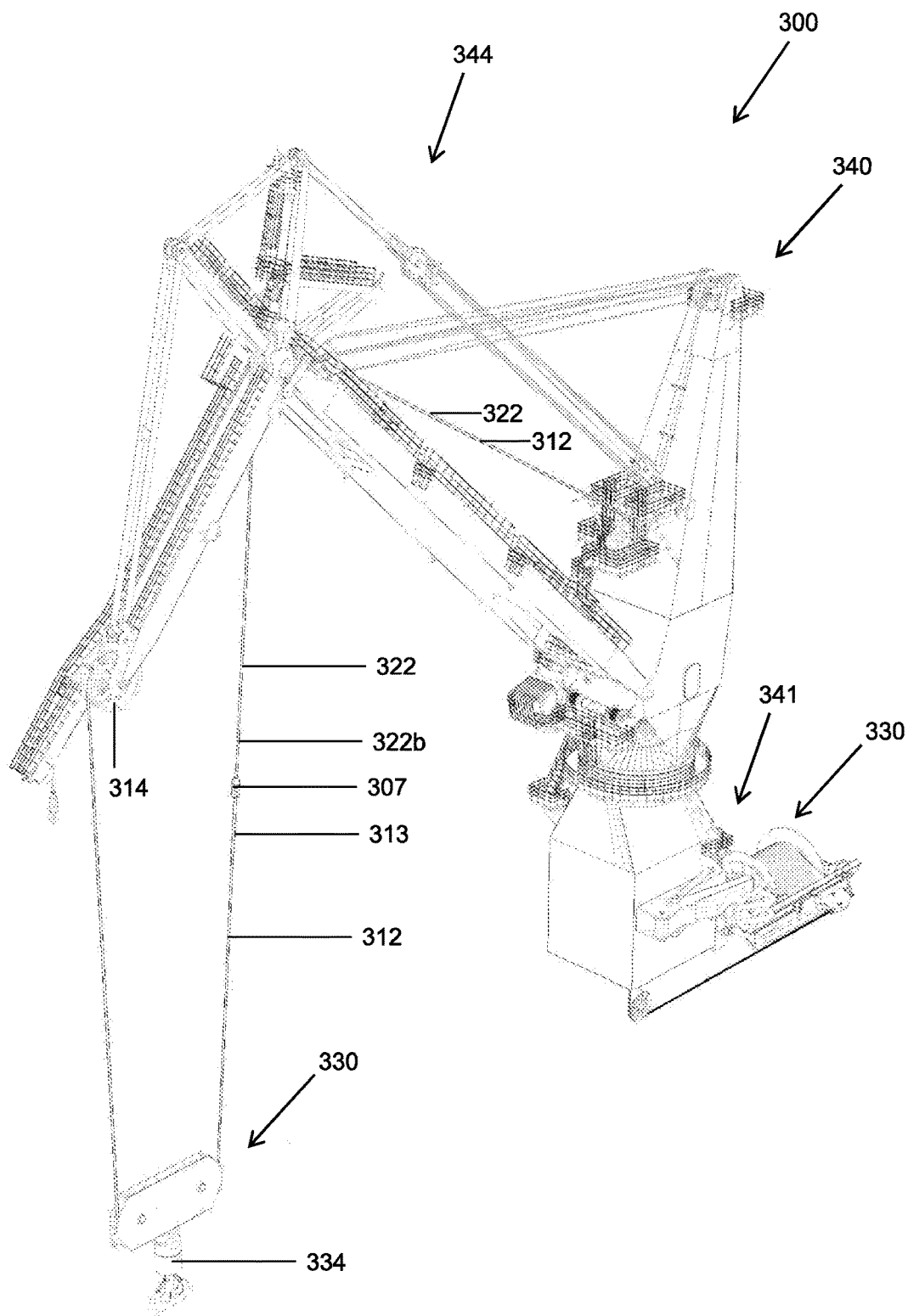

FIG. 8 shows an embodiment of the system 300 which is used for lowering and/or hoisting a subsea object.

The system 300 comprises a crane 340, here of the type knuckle boom crane. A pedestal 341 is fitted on the hull of a vessel. A revolving superstructure is supported on said pedestal 341 via a slew bearing so as to allow revolving about a vertical slew axis. The crane comprises a boom assembly 344, here a knuckle boom assembly, connected to the superstructure.

The system 300 comprises a synthetic fiber rope winch assembly comprising a motor driven first winch, which is located inside the pedestal 341 and therefore not visible from FIG. 8, and a length of synthetic fibre rope 312 driven by said first winch. Here, the first winch is a traction winch, and the system 300 further comprises a fiber rope storage winch 316 which stores the length of synthetic fiber rope 312, and a level winding or spooling device 317. Both the fiber rope storage winch 316 and the level winding or spooling device 317 are mounted below the deck of the vessel. The deck is not shown in the Figure. The synthetic fibre rope 312 extends from the storage winch 316 via the level winding or spooling device 317 and the first winch and via a fiber rope departing sheave 314 to a lifting block sheave of a lifting block 330.

Through the lifting block sheaves of lifting block 330 the synthetic fiber rope 312 is run. The lifting block 330 here has a load connector 334, namely a hook, from which the object is to be suspended. The lifting block 330 comprises two lifting block sheaves along substantially the same vertical plane.

The system 300 further comprises a length of steel wire 322 having a second end 322b, wherein the end of the synthetic fiber rope 313 and the second end 322b of the steel wire are interconnected, here by means of a connector 307, so that the lifting block 330 is suspended in a double-fall arrangement.

The steel wire 322 extends from a second winch 321 via a steel wire departing sheave 324 to the connector 207. The boom assembly 344 carries both departure sheaves 314, 324.

The fall parts of the synthetic fibre rope 312 upwardly extend from a respective lifting block sheave at either side of the lifting block. At least as a result of the lifting block having two lifting block sheaves, and the arrangement of the departure sheaves with respect to each other, the falls are spread apart, e.g. so to reduce the risk for entanglement of the portions of the falls upwardly extending from the lifting block at either side thereof.

At least along the part of the course of the steel wire and fiber rope in between the boom knuckle and the first and second winches, external from the crane, the steel wire and fiber rope run side by side.

Preferably the length of synthetic fiber rope 211 is at least 600 meters long to allow for the application of the system in deepwater, in particular at least 4000 meters long.

Preferably the length of steel wire 322 is at most 1000 meters long, in particular at most 300 or 200 meters long.

Preferably the connector 307 that interconnects, and thus forms the connection between, the end 313 of the synthetic fiber rope 312, and the second end 322b of the steel wire 322 is releasable.

FIG. 9 shows an embodiment of a submergible hoisting block 60 according to the second aspect of the invention. It is adapted to suspend a load therefrom in a submerged condition with the block 60 being suspended from at least one winch driven hoisting cable, e.g. winch driven fiber rope or steel wire. Therein the lifting block 60 comprises:

a load bearing frame body 62 having sides formed by two frame side members 63 that are spaced apart from one another and define a space between them, the frame body 62 further having a top, a bottom, and a central vertical axis, two sheaves 61 rotatably mounted in the space between the two frame side members 63 each sheave being supported by the two frame side members, and a load connector 64 suspended from the load bearing frame body 62 in the central vertical axis and below the bottom thereof.

The lifting block 60 further comprises one or more external shape adapter members 65 mounted onto the load bearing frame body 62. These one or more external shape adapter members 65 cover substantially the sides of the load bearing frame body 62 and define a substantially rotationally symmetric shape about the central vertical axis of the load bearing frame body 62.

The external shape adapter members 65 are each mounted onto a respective frame side member 62 of the load bearing frame body 62 and covering at least a majority of the respective side of the load bearing frame body 62, the two external shape adapter members 65 thereby sandwiching the two frame side members 63 between them and defining a substantially rotationally symmetric shape about the central vertical axis of the load bearing frame body 62.

As is preferred, the one or more external shape adapter members 65 define a substantially spheroid shape that is rotationally symmetric the central vertical axis of the load bearing frame body 62.

The load connector 64 may be swivable about the central vertical axis relative to the load bearing frame body.

The external shape adapter members 65 may each be solid over at least the majority of the volume they define, or may be in the form of one or more hollow shells. Therein, the one or more shells may be formed and mounted to the lifting block such that an interior of the shells is filled with water upon lowering these along with the lifting block below sea level. It is furthermore noted that herein, the external shape adapter members 65 may be applied in either discussed embodiment of the deepwater hoisting system.

FIG. 10 shows another embodiment of a submergible hoisting block 70 according to the second aspect of the invention. It is adapted to suspend a load therefrom in a submerged condition with the block 70 being suspended from at least one winch driven hoisting cable, e.g. winch driven fiber rope or steel wire. Therein the lifting block 70 comprises:

a load bearing frame body 72 having sides formed by two frame side members 73 that are spaced apart from one another and define a space between them, the frame body 72 further having a top, a bottom, and a central vertical axis, a sheave 71 rotatably mounted in the space between the two frame side members 73 each sheave being supported by the two frame side members, and a load connector 74 suspended from the load bearing frame body 72 in the central vertical axis and below the bottom thereof.

The lifting block 70 further comprises one or more external shape adapter members 75 mounted onto the load bearing frame body 72. These one or more external shape adapter members 75 cover substantially the sides of the load bearing frame body 72 and define a substantially rotationally symmetric shape about the central vertical axis of the load bearing frame body 72.

The external shape adapter members 75 are each mounted onto a respective frame side member 72 of the load bearing frame body 72, the two external shape adapter members 75 thereby sandwiching the two frame side members 73 between them and defining a substantially rotationally symmetric shape about the central vertical axis of the load bearing frame body 72.

As is preferred, the one or more external shape adapter members 75 define a substantially spheroid shape that is rotationally symmetric the central vertical axis of the load bearing frame body 72.

The external shape adapter members 75 each define a half-spherical shape, of which the flat side faces and cover a side of the load bearing frame body, such that these external shape adapter members together with the still thereby not covered outer surface area of the load bearing frame body define a spherical, or approximately spherical, shape.

The load connector 74 may be swivable about the central vertical axis relative to the load bearing frame body.

The external shape adapter members 75 may each be solid over at least the majority of the volume they define, or may be in the form of one or more hollow shells. Therein, the one or more shells may be formed and mounted to the lifting block such that an interior of the shells is filled with water upon lowering these along with the lifting block below sea level. It is furthermore noted that herein, the external shape adapter members 75 may be applied in either discussed embodiment of the deepwater hoisting system.

It is furthermore noted that herein, the external shape adapter members 75 may be applied in either discussed embodiment of the deepwater hoisting system.

The invention claimed is:

1. A deepwater hoisting system provided with heave compensation functionality, wherein the system comprises:
   a synthetic fiber rope winch assembly comprising a motor driven first winch and a length of synthetic fiber rope driven by said first winch, said synthetic fiber rope having an end remote from the first winch;
   a steel wire winch assembly comprising a motor driven second winch and a length of steel wire driven by said second winch, said steel wire having an end remote from the second winch; and
   a lifting block having a lifting block sheave,
   wherein the synthetic fiber rope is run through said lifting block sheave,
   wherein the ends of the synthetic fiber rope and of the steel wire are interconnected, so that the lifting block is suspended in a double-fall arrangement, and
   wherein at least the second winch is an active heave compensation motor driven winch.

2. The deepwater hoisting system according to claim 1, wherein the system lacks any provision for performing heave compensation for the fibre rope.

3. The deepwater hoisting system according to claim 1, wherein said length of synthetic fiber rope is at least 600 meters long.

4. The deepwater hoisting system according to claim 2, wherein said length of fiber rope is at least 4000 metres long.

5. The deepwater hoisting system according to claim 4, wherein said length of steel wire is at most 200 metres long.

6. The deepwater hoisting system according to claim 1, wherein said length of steel wire is at most 1000 meters long.

7. The deepwater hoisting system according to claim 1, wherein the connection of the ends of the synthetic fiber rope and of the steel wire is releasable.

8. The deepwater hoisting system according to claim 1, wherein the system comprises a fiber rope departing sheave that is arranged above the water surface,—from which the fiber rope extends—in operation—into the water to the lifting block, and wherein the system comprises a steel wire departing sheave that is arranged above the water surface, wherein the system further comprises a steel wire guide that is arranged to engage on the steel wire in between the steel wire departing sheave and the water surface, the steel wire guide being adapted to deviate the steel wire from an imaginary straight line between the departing sheave and the lifting block sheave in order to spread the falls from which the lifting block is suspended.

9. The deepwater hoisting system according to claim 1, wherein the diameter of the lifting block sheave is at least 1.5 meters.

10. The deepwater hoisting system according to claim 1, wherein said first winch is a traction winch, and
wherein the system further comprises a fiber rope storage winch which stores said length of synthetic fiber rope, and from which the synthetic fiber rope extends to said first winch, via which the synthetic fiber rope extends to the lifting block sheave.

11. The deepwater hoisting system according to claim 1, wherein the first winch is mounted below decks.

12. The deepwater hoisting system according to claim 1, wherein the lifting block comprises two lifting block sheaves in substantially the same vertical plane.

13. The deepwater hoisting system according to claim 1, wherein said system comprises a crane, adapted to be fitted on an offshore vessel, the system comprising:
a pedestal to be stationary fitted on the hull of a vessel;
a revolving superstructure supported on said pedestal via a slew bearing so as to allow revolving about a vertical slew axis; and
a boom assembly connected to said superstructure and carrying at least one departing sheave for at least one of the fiber rope and the steel wire.

14. The deepwater hoisting system according to claim 13, wherein one of said motor driven first and second winches is mounted on said revolving superstructure, and
wherein the other one of said first and second winches is not mounted on said revolving superstructure.

15. The deepwater hoisting system according to claim 14, wherein the second winch is mounted on said revolving superstructure, and wherein the first winch is not mounted on said revolving superstructure.

16. The deepwater hoisting system according to claim 13, wherein both of said motor driven first and second winches are mounted on said revolving superstructure.

17. The deepwater hoisting system according to claim 13, wherein said first winch of the system is a traction winch, and
wherein the synthetic fiber rope winch assembly of the system further comprises a fiber rope storage winch which stores said length of synthetic fiber rope, and from which the synthetic fiber rope extends to said first winch, wherein the fiber rope storage winch, is not mounted on said revolving superstructure.

18. The deepwater hoisting system according to claim 17, wherein the fiber rope storage winch is mounted below decks.

19. The deepwater hoisting system according to claim 13, wherein the boom assembly carries both a fiber rope departing sheave and a steel wire departing sheave, wherein the fiber rope departing sheave and the steel wire departing sheave are arranged to vertically extend parallel to each other.

20. The deepwater hoisting system according to claim 1, wherein the lifting block comprises:
a load bearing frame body having sides formed by two frame side members that are spaced apart from one another and define a space between them, said frame body further having a top, a bottom, and a central vertical axis;
at least one sheave rotatably mounted in the space between said two frame side members each sheave being supported by said two frame side members; and
a load connector suspended from said load bearing frame body in said central vertical axis and below the bottom thereof,
wherein the lifting block further comprises one or more external shape adapter members mounted onto the load bearing frame body, said one or more external shape adapter members covering at least a majority of the sides of the load bearing frame body, said one or more external shape adapter members defining a substantially rotationally symmetric shape about the central vertical axis of the load bearing frame body.

21. The deepwater hoisting system according to claim 20, wherein the lifting block has two external shape adapter members, each mounted onto a respective frame side member of the load bearing frame body and covering at least a majority of the respective side of the load bearing frame body, said two external shape adapter members thereby sandwiching the two frame side members between them and defining a substantially rotationally symmetric shape about the central vertical axis of the load bearing frame body.

22. The deepwater hoisting system according to claim 20, wherein the one or more external shape adapter members define a substantially spheroid shape that is rotationally symmetric about at least the central vertical axis of the load bearing frame body.

23. The deepwater hoisting system according to claim 20, wherein the lifting block has two sheaves, each rotatably mounted in the space between said two frame side members, the sheaves being arranged in a common vertical plane and the sheaves having sheave axes that are horizontally offset from one another, each sheave being supported by said two frame side members.

24. The deepwater hoisting system according to claim 20, wherein the load connector is swivable about said central vertical axis relative to said load bearing frame body.

25. The deepwater hoisting system according to claim 20, wherein the one or more external shape adapter members are each solid over at least the majority of the volume they define.

26. The deepwater hoisting system according to claim 20, wherein the one or more external shape adapter members are in the form of one or more hollow shells.

27. The deepwater hoisting system according to claim 26, wherein the one or more shells are formed and mounted to the lifting block such that an interior of the shells is filled with water upon lowering these along with the lifting block below sea level.

28. The deepwater hoisting system according to claim 20, wherein the one or more external shape adapter members are made out of plastic or steel material.

29. A vessel provided with the system according to claim 1.

30. A method for deepwater lowering of an object, comprising using the system according to claim 1, wherein the object is suspended from the lifting block and is lowered from a position above or near the water surface to a position on or near the seabed, said lowering being in majority performed by pay out of fiber rope by means of the first winch, and wherein during one or more stages of said lowering heave compensation of the lifting block and the suspended object is provided by means of operating said second winch in active heave compensated mode.

31. The method according to claim 30, wherein during said majority of said lowering the connection between said ends of said fiber rope and said steel wire substantially remains in the same vertical position.

32. The method according to claim 30, wherein during said lowering any heave compensation of the lifting block and the suspended object is solely provided by the second motor driven winch operated in active heave compensation mode.

33. The method according to claim 30, wherein said first winch of the system is a traction winch, wherein the synthetic fiber rope winch assembly of the system further comprises a storage winch which stores said length of synthetic fiber rope, and from which the synthetic fiber rope extends to said first winch, and wherein during said lowering the lifting block the synthetic fiber rope is substantially not being tensioned in the portion of said length of synthetic fiber rope that is on the storage winch and in the portion of said length of synthetic fiber rope that extends from the storage winch to the first winch.

34. The method according to claim 30, wherein the interconnection of the ends of the synthetic fiber rope and of the steel wire is releasable, and wherein the lifting block is removable from the fiber rope, and wherein the system is used to perform hoisting of an object solely by making use of the steel wire winch assembly.

35. A method for deepwater hoisting of an object, comprising using the system according to claim 1, wherein the object is lifted from a position on or near the seabed to a position above or near the water surface, said lifting being in majority performed by draw in of fiber rope, by means of the first winch, and wherein during one or more stages of said lifting heave compensation of the lifting block and the suspended object is provided by means of operating said second winch in active heave compensated mode.

36. The method according to claim 35, wherein during said majority of said lifting the connection between said ends of said fiber rope and said steel wire substantially remains in the same vertical position.

37. The method according to claim 35, wherein during said lifting any heave compensation of the lifting block and the suspended object is solely provided by the second motor driven winch operated in active heave compensation mode.

38. The method according to claim 35, wherein said first winch of the system is a traction winch, wherein the synthetic fiber rope winch assembly of the system further comprises a storage winch which stores said length of synthetic fiber rope, and from which the synthetic fiber rope extends to said first winch, and wherein during said lowering and/or lifting the lifting block the synthetic fiber rope is substantially not being tensioned in the portion of said length of synthetic fiber rope that is on the storage winch and in the portion of said length of synthetic fiber rope that extends from the storage winch to the first winch.

39. The method according to claim 35, wherein the interconnection of the ends of the synthetic fiber rope and of the steel wire is releasable, and wherein the lifting block is removable from the fiber rope, and wherein the system is used to perform hoisting of an object solely by making use of the steel wire winch assembly.

40. A method for abandonment and recovery of pipeline, cable or umbilical from an offshore lay vessel, comprising using the system according to claim 1.

\* \* \* \* \*